US009965974B2

(12) United States Patent
Labbé et al.

(10) Patent No.: US 9,965,974 B2
(45) Date of Patent: May 8, 2018

(54) PORTABLE DEVICE WITH VIRTUAL TACTILE KEYBOARD AND REFRESHABLE BRAILLE DISPLAY

(71) Applicant: TECHNOLOGIES HUMANWARE INC., Drummondville (Québec) (CA)

(72) Inventors: Dominic R. Labbé, McMasterville (CA); Guy Santerre, Varennes (CA); Sébastien McKenzie-Faucher, Brossard (CA); Georges Bourque, Montréal (CA); Gregory Stilson, Madison, WI (US); Luc Blanchette, Montréal (CA); Éric Lapointe, Montréal (CA)

(73) Assignee: Technologies Humanware Inc. (CA)

( * ) Notice: Subject to any disclaimer, the term of this patent is extended or adjusted under 35 U.S.C. 154(b) by 292 days.

(21) Appl. No.: 14/643,919

(22) Filed: Mar. 10, 2015

(65) Prior Publication Data
US 2015/0262509 A1    Sep. 17, 2015

Related U.S. Application Data

(60) Provisional application No. 61/951,027, filed on Mar. 11, 2014.

(51) Int. Cl.
*G09B 21/00* (2006.01)
*G09B 21/02* (2006.01)

(52) U.S. Cl.
CPC ......... *G09B 21/004* (2013.01); *G09B 21/006* (2013.01); *G09B 21/025* (2013.01)

(58) Field of Classification Search
CPC .................................................. G09B 21/00
(Continued)

(56) References Cited

U.S. PATENT DOCUMENTS 5,293,464 A   3/1994  Hirano et al.
5,412,189 A   5/1995  Cragun
(Continued)

FOREIGN PATENT DOCUMENTS

WO   2012040365 A1   3/2012
WO   2012045844 A1   4/2012
(Continued)

OTHER PUBLICATIONS

Myers, Andrew, Stanford summer course yields touchscreen Braille writer, Stanford Report, Oct. 7, 2011.
(Continued)

*Primary Examiner* — Robert P Bullington
(74) *Attorney, Agent, or Firm* — Hovey Williams LLP

(57) ABSTRACT

A single-unit portable Braille device is provided that can include a housing and a touch-sensitive surface provided on the housing and configured to implement a virtual Braille keyboard including a plurality of virtual keys each associated with a key location on the touch-sensitive surface. The virtual Braille keyboard is configured for entry of input Braille data from a user contacting the touch-sensitive surface at one or more of the key locations. The portable Braille device also includes a refreshable Braille display provided on the housing and configured for outputting output Braille data for tactile reading by the user, and a processing unit in the housing and configured to receive the input Braille data from the touch-sensitive surface and to transmit the output Braille data to the refreshable Braille display. In some implementations, the portable Braille device includes a visual display located under the touch-sensitive surface.

15 Claims, 7 Drawing Sheets

(58) Field of Classification Search
USPC .......................................................... 434/113
See application file for complete search history.

(56) References Cited

U.S. PATENT DOCUMENTS

| | | | |
|---|---|---|---|
| 6,128,671 | A | 10/2000 | Weijand |
| 6,163,280 | A | 12/2000 | Breider |
| 6,255,938 | B1 | 7/2001 | Bornschein |
| 6,351,726 | B1 | 2/2002 | Wong |
| 6,542,623 | B1 | 4/2003 | Kahn |
| 6,636,202 | B2 | 10/2003 | Ishmael, Jr. et al. |
| 6,712,613 | B2 | 3/2004 | Depta |
| 6,827,512 | B1 | 12/2004 | Souluer |
| 6,961,048 | B2 | 11/2005 | Mitchell |
| 6,987,467 | B2 | 1/2006 | Romeo et al. |
| 7,020,840 | B2 | 3/2006 | Sharp |
| 7,029,190 | B1 | 4/2006 | Davis et al. |
| 7,106,220 | B2 | 9/2006 | Gourgey et al. |
| 7,184,032 | B2 | 2/2007 | Stohrer et al. |
| 7,234,882 | B2 | 6/2007 | Takada et al. |
| 7,318,195 | B2 | 1/2008 | Donahue |
| 7,407,335 | B2 | 8/2008 | Damery et al. |
| 7,432,912 | B2 | 10/2008 | Cote et al. |
| 7,952,564 | B2 | 5/2011 | Hurst et al. |
| 7,985,913 | B2 | 7/2011 | Machell |
| 8,077,021 | B2 | 12/2011 | Eldering |
| 8,085,253 | B2 | 12/2011 | Oveisi |
| 8,217,787 | B2 | 7/2012 | Miller, IV |
| 8,217,901 | B2 | 7/2012 | Mulcahy et al. |
| 8,358,204 | B2 | 1/2013 | Eldering |
| 8,382,480 | B2 | 2/2013 | Bucchieri |
| 8,388,346 | B2 | 3/2013 | Rantala et al. |
| 8,411,058 | B2 | 4/2013 | Wong et al. |
| 8,451,240 | B2 | 5/2013 | Pasquero et al. |
| 8,633,907 | B2 | 1/2014 | Mahalingam |
| 2005/0079472 | A1 | 4/2005 | Shimamura et al. |
| 2006/0280294 | A1 | 12/2006 | Zhang |
| 2007/0222758 | A1 | 9/2007 | Mulcahy et al. |
| 2007/0254268 | A1 | 11/2007 | Adachi et al. |
| 2009/0220923 | A1 | 9/2009 | Smith et al. |
| 2010/0052950 | A1 | 3/2010 | Collier |
| 2010/0238114 | A1* | 9/2010 | Vartanian ................ G06F 3/016 345/168 |
| 2011/0014983 | A1 | 1/2011 | Miller, IV |
| 2011/0020771 | A1 | 1/2011 | Rea et al. |
| 2011/0111375 | A1* | 5/2011 | Luu ....................... G09B 21/004 434/114 |
| 2011/0143321 | A1 | 6/2011 | Tran et al. |
| 2011/0216006 | A1* | 9/2011 | Litschel ................. G06F 3/016 345/168 |
| 2011/0304546 | A1 | 12/2011 | Rea |
| 2012/0050172 | A1* | 3/2012 | Wong ..................... G06F 3/011 345/173 |
| 2012/0070805 | A1 | 3/2012 | Wong et al. |
| 2012/0218193 | A1 | 8/2012 | Weber et al. |
| 2012/0268389 | A1 | 10/2012 | Yaron et al. |
| 2012/0299853 | A1 | 11/2012 | Dagar |
| 2012/0306633 | A1 | 12/2012 | Heron et al. |
| 2012/0315606 | A1 | 12/2012 | Jwa |
| 2013/0044100 | A1 | 2/2013 | King |
| 2013/0157230 | A1 | 6/2013 | Morgan |
| 2013/0249821 | A1 | 9/2013 | Dharmaraja et al. |
| 2013/0278552 | A1* | 10/2013 | Kamin-Lyndgaard . G09G 5/006 345/174 |
| 2013/0321302 | A1 | 12/2013 | Naccache et al. |
| 2014/0009405 | A1 | 1/2014 | Wissgott et al. |
| 2014/0022162 | A1 | 1/2014 | Yu et al. |

FOREIGN PATENT DOCUMENTS

| | | |
|---|---|---|
| WO | 2012134210 A2 | 10/2012 |
| WO | 2013169279 A1 | 11/2013 |

OTHER PUBLICATIONS

Bonnington, Christina, Touchscreen Braille writer lets the blind type on a tablet, Wired, 2011, http://www.wired.com/gadgetlab/2011/10/touchscreen-braille-writer/.

Username: Georgia Tech, BrailleTouch helps visually impaired users, Feb. 15, 2012, http://www.youtube.com/watch?v=r1E01bUFHs1.

Username: Harish Kothendaraman, Braille Touch Tablet, Oct. 10, 2011, http://www.youtube.com/watch?v=vUhR6VF1318.

Username: Stanford, Stanford course yields touchscreen Braille Writer, Oct. 6, 2011, http://www.youtube.com/watch?v=ABfCXJSjAq0.

Username: Radisbruder, Braille dynamic virtual keyboard, Nov. 9, 2011, http://www.youtube.com/watch?v=jQMICveLzW0.

Username: Shiri Azenkot, Perkinput: Eyes-free text entry on Smartphones and Tablets, Jul. 19, 2012, http://www.youtube.com/watch?v=Ot8_IObS1Lc.

Username: Onlygeek, Braille type by Ankit Daftery, Exclusive preview (Beta), Oct. 17, 2011, http://www.youtube.com/watch?v=wQE870a_S3k.

Username: Gan, BrailleKeyboard; Help using Android Smartphone program for the visually impaired, Mar. 14, 2013, http://www.youtube.com/watch?v=P1uykVMJ-oc.

Username: UPSENSE1, Inpris keyboard (UpSense) tutorial, Jul. 22, 2012, http://www.youtube.com/watch?feature=player_embedded&v=5_DGY2-oxbw#.

Username: Arnanto Akbar, Sparkins—Touch based solution like Perkins Brailler, Jun. 23, 2011, https://www.youtube.com/watch?v=xoBbtf_dWL4.

* cited by examiner

PORTABLE DEVICE WITH VIRTUAL TACTILE KEYBOARD AND REFRESHABLE BRAILLE DISPLAY

TECHNICAL FIELD

The technical field generally relates to Braille systems and devices for blind and visually impaired individuals, and more particularly to a portable electronic Braille device for inputting and outputting Braille content.

BACKGROUND

Braille is used by blind and visually impaired individuals as a means of reading and writing text, and a wide range of devices and systems are available for these purposes. Such devices and systems include Braille writers and readers for use either as standalone units or in communication with other electronic devices such as, for example, personal computers, tablet computers, smartphones, personal digital assistants, and the like.

Over the last decade, many blind and visually impaired individuals have started using portable Braille devices, also known as notetakers. Notetakers include input and output interfaces for respectively entering and displaying Braille content. The input interface is typically embodied by a Perkins-style Braille keyboard while the output interface can consist of a refreshable Braille display adjacent to the Braille keyboard and provided with one or more rows of Braille cells. Each Braille cell typically includes a plurality of electromechanically controlled pins or dots which can be selectively moved up and down to enable tactile Braille reading.

In addition to being useful for typing and displaying Braille content, some notetakers can be operated as portable computers with software intelligence and processing capabilities that allow many functions to be performed such as, for example, e-mail and Internet access, data storage, book reading, calendar and contact information management, and connectivity to peripheral devices such as personal computers, tablet computers, smartphones, cellular phones, keyboards, monitors, printers, embossers, hard and flash drives, a camera, and the like.

More recently, due to the widespread use of tablet computers and smartphones, Braille notetakers have faced intense competition from these lightweight, versatile and ergonomically-designed mobile devices. For example, many of these devices now offer Braille mobile applications targeting the communication needs and preferences of blind and visually impaired individuals. However, devices intended primarily for the general public are not necessarily well adapted to these needs and preferences.

Accordingly, various challenges still exist in the field of portable electronic Braille devices and systems.

SUMMARY

According to an aspect of the invention, there is provided a single-unit portable Braille device including:
 a housing;
 a touch-sensitive surface provided on the housing and configured to implement a virtual Braille keyboard including a plurality of virtual keys each associated with a key location on the touch-sensitive surface, the virtual Braille keyboard being configured for entry of input Braille data from a user contacting the touch-sensitive surface at one or more of the key locations;
 a refreshable Braille display provided on the housing and configured for outputting output Braille data for tactile reading by the user; and
 a processing unit in the housing and configured to receive the input Braille data from the touch-sensitive surface and to transmit the output Braille data to the refreshable Braille display.

According to another aspect of the invention, there is provided a single-unit portable Braille device including:
 a housing; and
 a touchscreen extending on the housing, the touchscreen comprising a visual display and a touch-sensitive surface superimposed on the visual display and configured to implement a virtual Braille keyboard configured for entry of input Braille data from a user, the touch-sensitive surface extending across a surface area larger than a surface area of the visual display.

Other features and advantages of the embodiments of the present invention will be better understood upon reading of exemplary embodiments thereof with reference to the appended drawings.

BRIEF DESCRIPTION OF THE DRAWINGS

In FIG. 4A, the typing cover is disposed over and in contact with the touch-sensitive surface in a typing position. In FIG. 4B, the typing cover is pivoted at an angle away from the touch-sensitive surface in a non-typing position.

DETAILED DESCRIPTION

Figure 1:
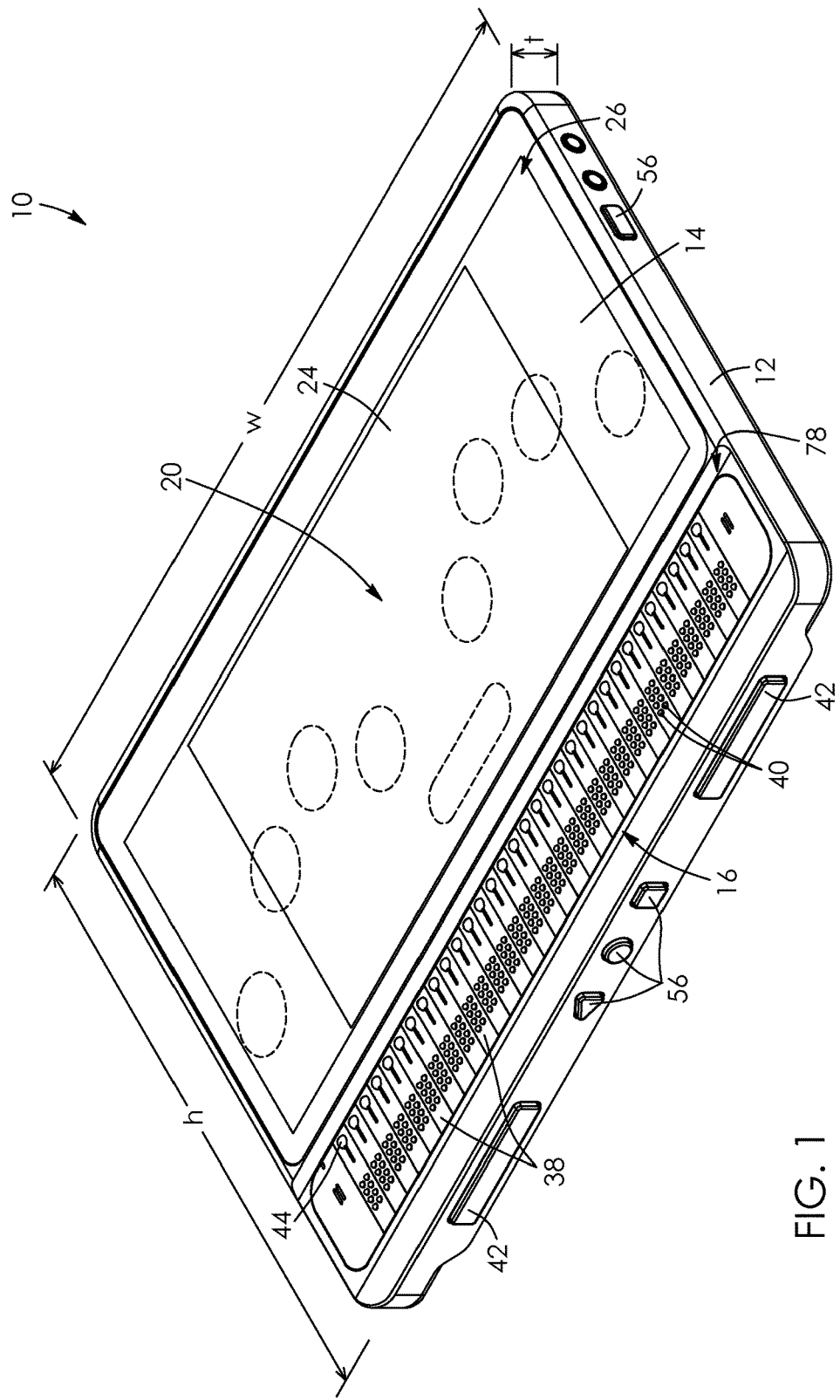
FIG. 1 is a schematic perspective view of a single-unit portable Braille device in accordance with an embodiment.

In the following description, similar features in the drawings have been given similar reference numerals, and, in order to not unduly encumber the figures, some elements may not be indicated on some figures if they were already identified in preceding figures. It should also be understood herein that the elements of the drawings are not necessarily depicted to scale, since emphasis is placed upon clearly illustrating the elements and structures of the present embodiments.

The present description generally relates to a single-unit portable Braille device for inputting and outputting Braille content. It is to be noted that, for simplicity, the expression "single-unit portable Braille device" may in some instances be shortened to "portable Braille device", "single-unit Braille device" or simply "Braille device".

Figure 2:
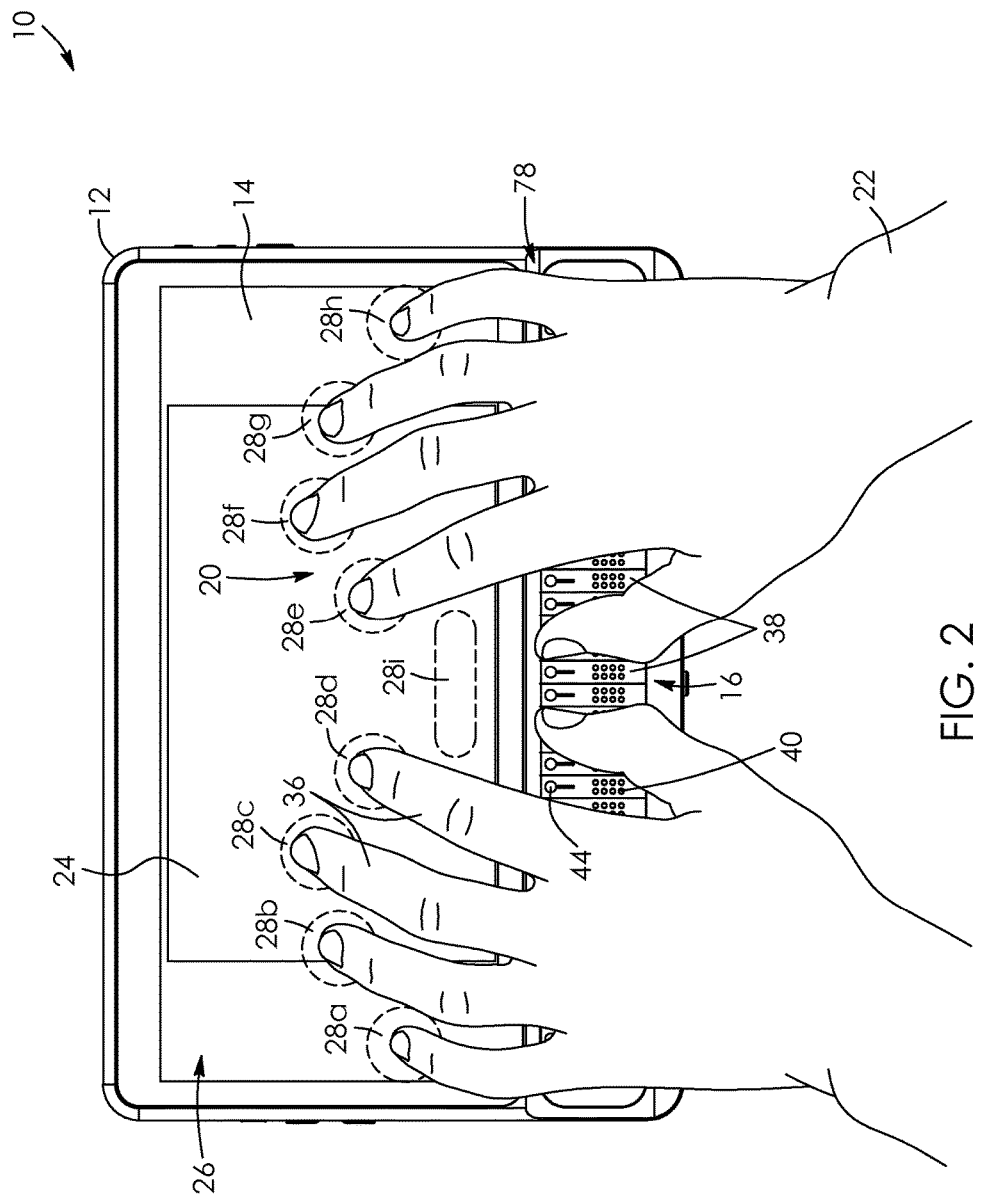
FIG. 2 is a top plan view of the single-unit portable Braille device of FIG. 1.
Figure 3:
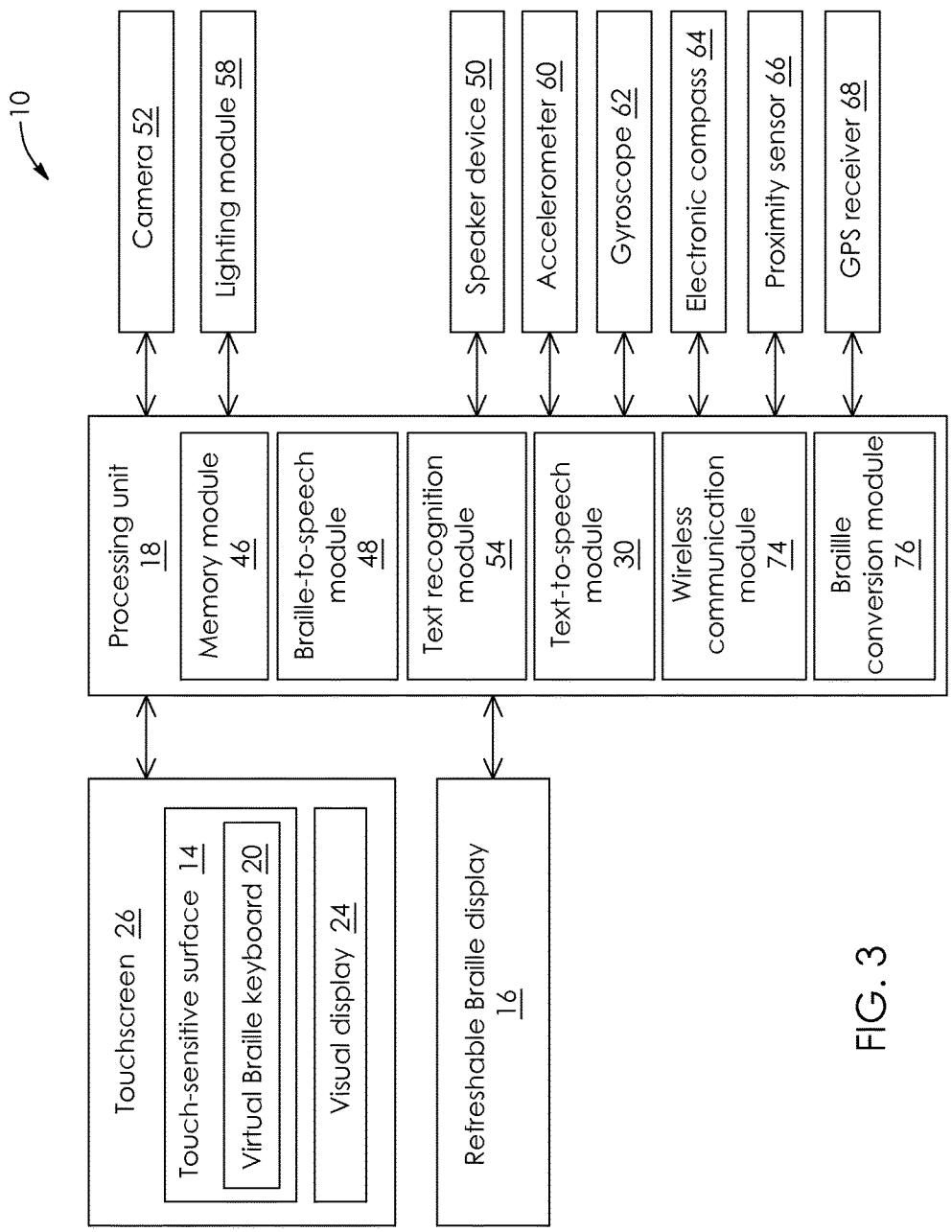
FIG. 3 is a schematic functional block diagram of the single-unit portable Braille of FIG. 1

Referring to FIGS. 1 to 3, and as discussed further below, an exemplary embodiment of a single-unit portable Braille device 10 is illustrated and generally includes four main components: a housing 12, a touch-sensitive surface 14, a refreshable Braille display 16, and a processing unit 18. The touch-sensitive surface 14 is provided on the housing 12 and is configured to implement a virtual Braille keyboard 20 configured for entry of input Braille data from a user 22. The refreshable Braille display 16 is also provided on the housing 12 and is configured for outputting output Braille data for tactile reading by the user 22. The processing unit 18 is provided inside the housing and is configured to receive the input Braille data from the touch-sensitive surface 14 and to transmit the output Braille data to the refreshable Braille display 16. In some embodiments, the portable Braille device 10 can also include a visual display 24 located below the touch-sensitive surface 14 and forming a touchscreen 26 therewith. In some cases, the touch-sensitive surface 14 may extend across a surface area larger than a surface area of the visual display 24.

The portable Braille devices described herein may be useful in any application where it is desirable, intended or required to provide a device having the processing capabilities for inputting and outputting Braille content to individuals suffering from blindness, low vision or other visual impairments. Although the terms "blind individuals", "low-vision individuals" and "print-disabled individuals" are sometimes defined as referring to particular levels of visual acuity, those skilled in the art will recognize that the portable Braille device described herein may be used by any person requiring or desiring a device capable of storing, processing and/or retrieving electronic information and of inputting and outputting that information in a suitable Braille format. In particular, embodiments of the portable Braille device may be of use to sighted people that do not suffer from any visual impairment but who nonetheless wish to communicate using Braille.

As used herein, the term "single-unit" is intended to refer to the fact that the physical components of the Braille device are manufactured into an integral structure whose overall shape and dimensions generally match those of the housing. It will be understood that in some embodiments, the single-unit Braille device may include all the necessary hardware, software and processing capabilities to receive, process, store, retrieve, modify and display Braille content or data, as well as other types of information, as a standalone unit without requiring connection to another device. Alternatively, in other embodiments, the single-unit portable Braille device may act mostly as a Braille input/output (I/O) terminal, which is intended to be connected or coupled to at least one peripheral device to perform one or more functions.

As used herein, the term "portable" is intended to refer to an electronic Braille device that is both small and light enough to be readily carried by a user. However, although the portable Braille device can be used as a standalone unit, it may also be connected to and used in combination with stationary equipment. Accordingly, in some embodiments, the single-unit portable Braille device may be momentarily, or permanently, connected to one or more peripheral devices such as, for example, a personal computer, a tablet computer, a smartphone, a cellular phone, a keyboard, a monitor, a printer, an embosser, a hard or a flash drive, a camera, and the like.

As used herein, the term "connected", "coupled" and any variants thereof means any connection or coupling, either direct or indirect, between two or more elements. The connection or coupling between the elements may be physical, logical, electrical or a combination thereof. Additionally, data communication between the connected or coupled elements may be wired, wireless or a combination thereof.

More regarding various structural and operational features and components of the single-portable Braille device will be described in greater detail below.

Housing

Referring to FIGS. 1 to 3, the single-unit portable Braille device 10 includes a housing 12. The housing 12 generally defines the overall shape of the portable Braille device 10 and houses, holds, supports and/or protects its various components. The housing 12 can consist of a thin rectangular shell made of light yet sturdy and durable material such as, for example, a molded plastic shell or lightweight metal alloys such as aluminum-magnesium alloys.

In the illustrated embodiment, the housing 12 is shaped as a rectangular prism of width w, height h and thickness t. It will be appreciated that the housing 12 may have an ergonomic shape and be lightweight to facilitate grasping and holding of the portable Braille device 10. For example, in some embodiments, the portable Braille device 10 may weigh less than 900 grams and may be provided with rounded corners to facilitate holding and handling by a user. The width w, height h and thickness t may each be selected based on the particularities or requirements of a given application. For example, in the illustrated embodiment, w=244 mm, h=160 mm and t=19.8 mm. Of course, these dimensions are given for illustrative purposes only and may differ in other embodiments. It will also be understood that the housing 12 may assume a variety of shapes other than rectangular such as, for example, circular, semi-circular, square, elliptical, oval, parallelepipedal or trapezoidal.

As illustrated in FIG. 1, the width w of the housing 12 generally sets the maximum value permissible for the width of each of the touch-sensitive surface 14 and the refreshable Braille display 16. Accordingly, in some embodiments, the width w of the housing 12 can be selected based on a desired, intended or required width for the touch-sensitive surface 14 and/or the refreshable Braille display 16. In other words, in some embodiment, the width w of the housing 12 may be substantially equal to the width of the touch-sensitive surface 14 and/or to the width of the refreshable Braille display 16. It will also be understood that the width-to-thickness (w/t) and height-to-thickness (h/t) ratios of the housing 12 can each be made relatively large, so as to ensure that the portable Braille device 10 has large enough touch-sensitive surface 14 and refreshable Braille display 16 while remaining sufficiently thin for ease of holding by a user.

Touch-Sensitive Surface

Referring to FIGS. 1 to 3, the single-unit portable Braille device 10 also includes a touch-sensitive surface 14. The touch-sensitive surface 14 is provided on the housing 12 and is configured to implement a virtual Braille keyboard 20. The virtual Braille keyboard 20 includes a plurality of virtual keys 28a to 28i, each of which being associated with a key location on the touch-sensitive surface 14. The virtual Braille keyboard is configured for entry of input Braille data from a user 22 contacting the touch-sensitive surface 14 at one or more of the key locations.

As used herein, the term "virtual keyboard" is intended to refer to a software-based representation of a tactile keyboard implemented on a touch-sensitive surface as a plurality of user-selectable virtual keys. In particular, the term "virtual Braille keyboard" denotes a virtual representation of a Braille keyboard implemented on a touch-sensitive surface. The virtual Braille keyboard can be configured in a Perkins-style Braille keyboard layout or in another type of Braille keyboard layout. In a virtual keyboard, each virtual key is associated with a key location on the touch-sensitive surface and is configured for tactile data entry by a user. When a user initiates a typing event by contacting the touch-sensitive surface at the key location of a particular virtual key, hardware and/or software processing resources associated with the virtual keyboard may be used to: (i) detect the typing event; (ii) determine a touch location on the touch-sensitive surface where the typing event occurred; (iii) identify which particular virtual key is associated with the touch location; and (iv) interpret the typing event as a keystroke of the particular virtual key.

It is to be noted that implementing a virtual Braille keyboard on a touch-sensitive surface allows Braille to be typed via tactile interactions, thereby simulating the operation of physical Braille keyboards without some of their limitations and drawbacks, notably in terms of ergonomics and comfort. In particular, it will be appreciated that in contrast to physical Braille keyboards whose dimensions and layout cannot readily be adjusted to a user's preferences, a virtual Braille keyboard may be customized to suit a user's fingers and/or preferred typing position. Accordingly, some embodiments of the portable Braille device can provide a more ergonomic and comfortable touch-based interface for a user's hands and fingertips compared to the rigid physical Braille keyboard of existing portable Braille devices, such as notetakers.

In FIG. 2, the virtual Braille keyboard 20 is arranged in accordance with a Perkins-style Braille keyboard layout including nine virtual keys 28a to 28i. In the illustrated embodiment, the nine virtual keys 28a to 28i consists of eight dot keys 28a to 28h and a spacebar key 28i. Of course, other embodiments can implement other types of Braille keyboard layouts to suit a particular application. By way of example, in some embodiments, the virtual Braille keyboard 20 can be implemented as an eight-key Perkins-style Braille keyboard, a six-key Perkins-style Braille keyboard or any other suitable type of Perkins or non-Perkins Braille keyboard layout. It will be understood that because the layout of the virtual Braille keyboard 20 implemented on the touch-sensitive surface 14 is software-generated, in some embodiments it may allow for the user 22 to conveniently switch from one virtual keyboard layout to another, thus providing an advantage in terms of versatility over known portable Braille devices with a non-customizable physical Braille keyboards.

Figure 6:
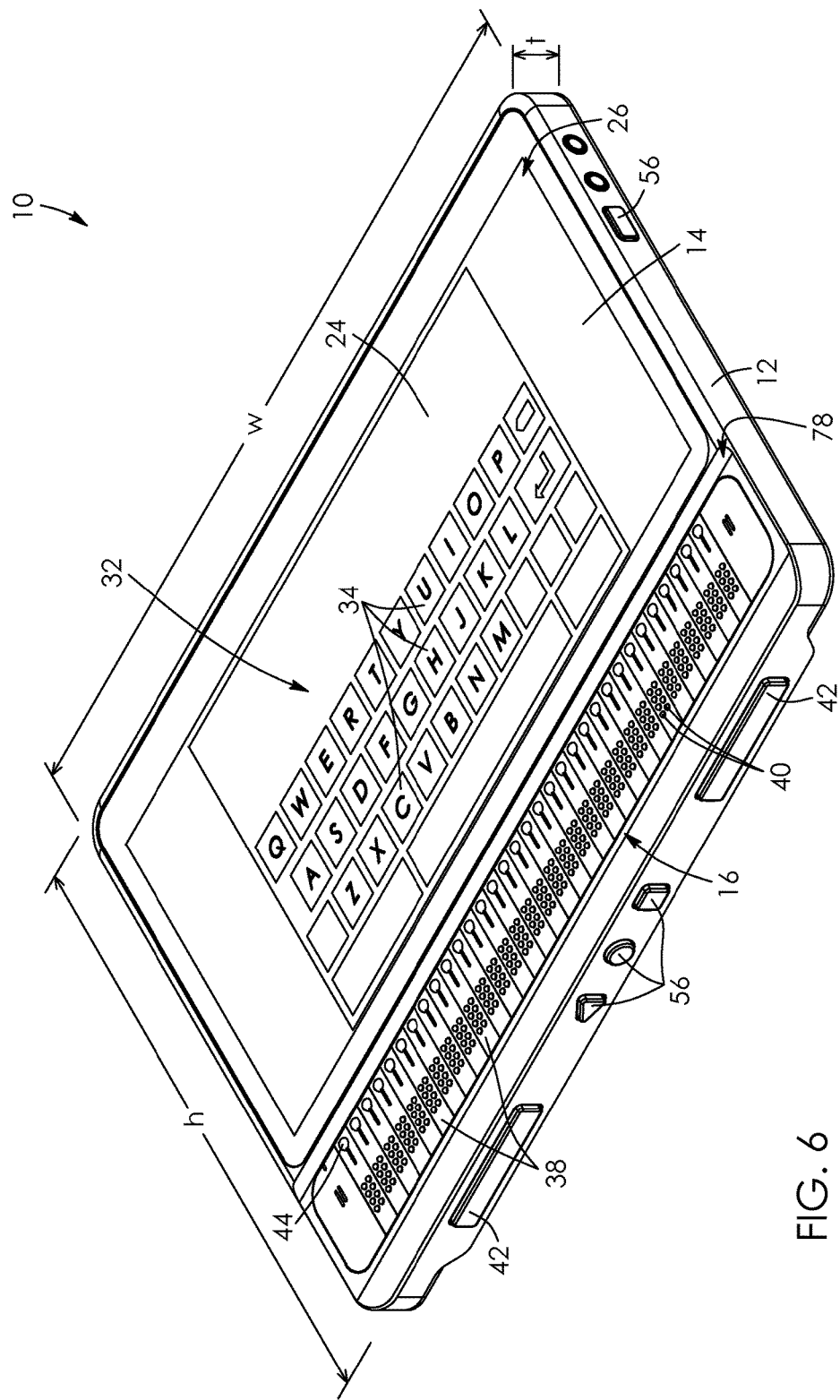
FIG. 6 is a schematic perspective view of a single-unit portable Braille device of FIG. 1, illustrating a mode of operation of the portable Braille device wherein the touch-sensitive surface is configured to implement a non-Braille virtual keyboard.

Referring now to FIGS. 2 and 6, in some embodiments, the portable Braille device 10 may include a Braille typing mode and a non-Braille typing mode. In the Braille typing mode, the touch-sensitive surface 14 implements a virtual Braille keyboard 20, such as illustrated in FIG. 2. Meanwhile, in the non-Braille typing mode, the touch-sensitive surface 14 implements a virtual non-Braille keyboard 32 including a plurality of virtual keys 34, as illustrated in FIG. 6. Accordingly, depending on the intended application, the portable Braille device 10 can switch or toggle between the Braille and non-Braille typing modes either automatically (e.g., after a predetermined period of inactivity in the non-Braille typing mode, the portable Braille device 10 may be configured to automatically switch to the Braille typing mode) or at least partially in response to a user input signal or command. The virtual non-Braille keyboard 32 illustrated in FIG. 6 may be arranged in accordance with various types of QWERTY-based and non-QWERTY-based keyboard layouts to suit a particular application of the portable Braille device 10. As known in the art, exemplary non-QWERTY-based keyboard layouts include, without being limited to, QWERTZ, AZERTY, Dvorak, Colemak, Arabic, Chinese, Cyrillic and Hangul.

Referring back to FIGS. 1 and 2, each of the virtual keys 28a to 28i is associated with a key location on the touch-sensitive surface 14. Upon tactile contact of a user's fingers 36 with one or several of the regions of the touch-sensitive surface 14 corresponding to the virtual keys 28a to 28i of the virtual Braille keyboard 20, different Braille characters can be entered by the user 22. Braille characters can include, for example, letters, numbers, punctuations, symbols, indicators, Braille composition signs, and the like. Each typing entry may, but need not, be acknowledged by audio and/or vibration feedback.

In the embodiment of FIGS. 1 and 2, the touch-sensitive surface 14 is shaped as a rectangle having a width of 222 millimeters and a height of 114 millimeters. Of course, these particular dimensions are given for illustrative purposes only and can be varied in other embodiments. For example, in some embodiments, the touch-sensitive surface 14 can have a width ranging from about 115 to 250 millimeters and a height ranging from about 40 to 150 millimeters. The touch-sensitive surface 14 need not be rectangular but may assume various other shapes. In some embodiments, the touch-sensitive surface 14 may be provided with rounded corners. The width and height of the touch-sensitive surface 14 may be selected to provide a virtual Braille keyboard 20 whose dimensions are sufficiently large to ensure a comfortable typing experience for users of most hand sizes.

Furthermore, depending on the requirements and particularities of a given application, the touch-sensitive surface can employ different touch-sensing technologies including, but not limited to, capacitive, multi-touch capacitive, resistive, resonant inductive coupling, infrared scan and surface acoustic wave touch-sensing technologies.

Visual Display

In some embodiments, the single-unit portable Braille device 10 can also include a visual display 24 underlying the touch-sensitive surface 14. In such embodiments, the touch-sensitive surface 14 and the visual display 24 together form a touchscreen 26 of the portable Braille device 10. Although not directly useful for blind individuals, the provision of a visual display can be useful to low-vision, print-disabled or sighted users, or for a visually impaired user to share content with sighted individuals. For example, teachers of blind students who use the portable Braille device may use the visual display to review the work of their students.

The visual display 24 can provide an output interface for presenting visual content such as, for example, documents, images, videos, e-mails, Internet pages, e-books, calendars, and the like. In particular, in some embodiments, the visual display 24 may be configured to display the input Braille data entered on the virtual Braille keyboard 20 as visually readable text.

It is to be understood that the virtual keys 28a to 28i are depicted in FIG. 2 to illustrate more clearly how the virtual Braille keyboard 20 can be implemented on the touch-sensitive surface 14. Indeed, although in some embodiments the visual display 24 may allow for the virtual Braille keyboard 20 to be displayed to the user 22, in other embodiments the virtual Braille keyboard 20 may not necessarily be visually displayed on the visual display 24. For this reason, the keys 28a to 28i of the virtual Braille keyboard 20 are delimited by dashed lines in FIG. 2. Of course, in implementations of the portable Braille device 10 that do not include a visual display 24, the virtual Braille keyboard 20 would not be visible to a user 22.

The visual display 24 can use liquid crystal display (LCD) technology, although any other appropriate display technology such as, for example, light-emitting diode (LED) technology, organic LED (OLED) technology, plasma display panel (PDP) technology, light-emitting polymer display (LPD) technology, active-matrix OLED (AMOLED) technology or electrophoretic ink technology may be used in other embodiments. The visual display 24 may also include a backlight unit for providing backlight illumination toward the visual display 24. Depending on the intended application, the visual display 24 may have a diagonal measurement of between about 2.5 and 12 inches, and a resolution of at least 0.136 megapixels, corresponding to an array size of 426×320 pixels. For example, in the embodiment of FIGS. 1 and 2, the visual display 24 has a width of 155 millimeters, a height of 93 millimeters (corresponding to a diagonal measurement of about 7 inches) and a resolution of 0.614 megapixels (corresponding to an array size of 1024×600 pixels). Of course, these particular dimensions are given for illustrative purposes only and can be varied in other embodiments. For example, in some embodiments, the visual display 24 can have a width ranging from about 96 to 220 millimeters and a height ranging from about 53 to 140 millimeters.

In FIGS. 1 and 2, the visual display 24 extends over a surface area which is smaller than a surface area of the touch-sensitive surface 14. This can be explained by the fact that, in some implementations of the portable Braille device 10, providing the visual display 24 and the touch-sensitive surface 14 with different width-to-height aspect ratios may be desirable or required, as discussed further below. By way of example, in some implementations, a ratio of the width to the height of the touch-sensitive surface can range from about 1 to 2.5, and a ratio of the width to the height of the visual display can range from about 1.3 to 2.

In particular, in the embodiment of FIGS. 1 and 2, the touch-sensitive surface 14 and the visual display 24 are shaped as rectangles having different widths and substantially equal heights. More specifically, the visual display 24 has a width-to-height aspect ratio of 155/93≈1.67 while the touch-sensitive surface 14 has width-to-height aspect ratio of 220/114≈1.93. Of course, various other aspect ratios may be used for either or both of the visual display 24 and the touch-sensitive surface 14 such as, for example, 4:3 and 16:9.

It will be understood that although it may be desirable that the portable Braille device be made as compact as possible, the presence of a virtual Braille keyboard often entails that the width of the portable Braille device is kept above a certain value in order to provide a comfortable typing experience for a broad range of user's hand sizes. However, the width-to-height aspect ratio of a typical visual display is generally smaller than the width-to-height aspect ratio of a typical Braille keyboard. This means that for a typical visual display and a typical Braille keyboard having the same width, the height of the typical visual display will generally be larger than the height of the typical Braille keyboard. Accordingly, using a visual display having a width that substantially matches the width of the touch-sensitive surface implementing the virtual Braille keyboard may increase the height of the portable Braille device beyond what would generally be considered practical or desirable.

As a result, in some embodiments, the touchscreen 26 may be designed to have a form factor that maximizes the height of the visual display 24 for given values of the width and height of the touch-sensitive surface 14, and the width-to-height ratio of the visual display 24, as illustrated in FIGS. 1 and 2. In other words, in some embodiments, the visual display 24 occupies a smaller area than the touch-sensitive surface 14 so as to minimize the overall size of the portable Braille device 10 while both maximizing the width of the touch-sensitive surface 14 and maintaining a standard aspect ratio for the visual display 24. For example, in the embodiment of FIGS. 1 and 2, the height of the visual display 24 is approximately equal to 93 millimeters, which is only slightly less than the height of 114 millimeters of the touch-sensitive surface 14.

Refreshable Braille display

Referring to FIGS. 1 to 3, the single-unit portable Braille device 10 also includes a refreshable Braille display 16 provided on the housing 12 and configured for outputting output Braille data for tactile reading by the user 22.

As used herein, the term "refreshable Braille display" refers to a component of the portable Braille device that is capable of presenting Braille data (e.g., Braille characters such as letters, numbers, punctuations, symbols, indicators, Braille composition signs, and the like) to a user. In particular, the term "refreshable" is intended to mean that the Braille display is capable of refreshing or changing over time, either automatically or controllably, the Braille data that is displayed to the user.

In FIGS. 1 and 2, the touch-sensitive surface 14 and the refreshable Braille display 16 are provided on a same face 78 of the housing 12, with the refreshable Braille display 16 located below the touch-sensitive surface 14. Of course, other configurations could be envisioned in other embodiments. As used herein, the term "below" when referring to the position of the refreshable Braille display 16 with respect to the touch-sensitive surface 14 is meant to indicate that the refreshable Braille display 16 is closer to the user during normal use of the portable Braille device 10.

In some embodiments, the refreshable Braille display 16 can include a linear array of one or more rows of adjacent Braille cells 38. The refreshable Braille display 16 depicted in FIGS. 1 and 2 includes one row of thirty-two Braille cells 38, but this number can of course be varied in other embodiments. For example, in some embodiments, the refreshable Braille display 16 may include fourteen, sixteen, eighteen or twenty Braille cells. Likewise, in some embodiments, the refreshable Braille display 16 may include more than one row of Braille cells 38.

As mentioned above, in some embodiments, the width w of the housing 12 may be selected based on the width and the number of Braille cells 38 in the refreshable Braille display 16.

Referring still to FIGS. 1 and 2, each Braille cell 38 may, but need not, include a plurality of electromechanically actuated or controlled pins 40, where each pin 40 is selectively raisable and lowerable to enable tactile Braille reading by the user 22. In the illustrated embodiment, each Braille cell 38 has eight pins 40 arranged in two columns of four pins, but other configurations are possible such as, for example, six pins arranged in two columns of three pins. As known in the art, the electromechanically actuated pins 40 of each Braille cell 38 can be moved up and down in response to an electrical signal originating from the processing unit to form different combinations of raised pins representing Braille characters such as, for example, letters, numbers, punctuations, symbols, indicators, Braille composition signs, and the like.

It will be understood that in embodiments where the refreshable Braille display is provided with Braille cells, the Braille cells need not involve or be based on an electromechanical actuation, but could be activated using any other suitable actuation technology (e.g., magnetic or infrared laser radiation) without departing from the scope of the invention. Additionally, it will be understood that the refreshable Braille display need not be embodied by Braille cells, but could be embodied by any suitable element (e.g., a tactile image screen) capable of presenting, displaying or otherwise outputting Braille content to a user in a refreshable manner.

In some embodiments, the refreshable Braille display 16 may optionally include navigation keys or buttons such as, for example, front thumb keys 42 and router keys 44. The provision of such navigation keys or buttons can allow the user 22 to navigate through a document stored inside the portable Braille device 10.

Figure 5:
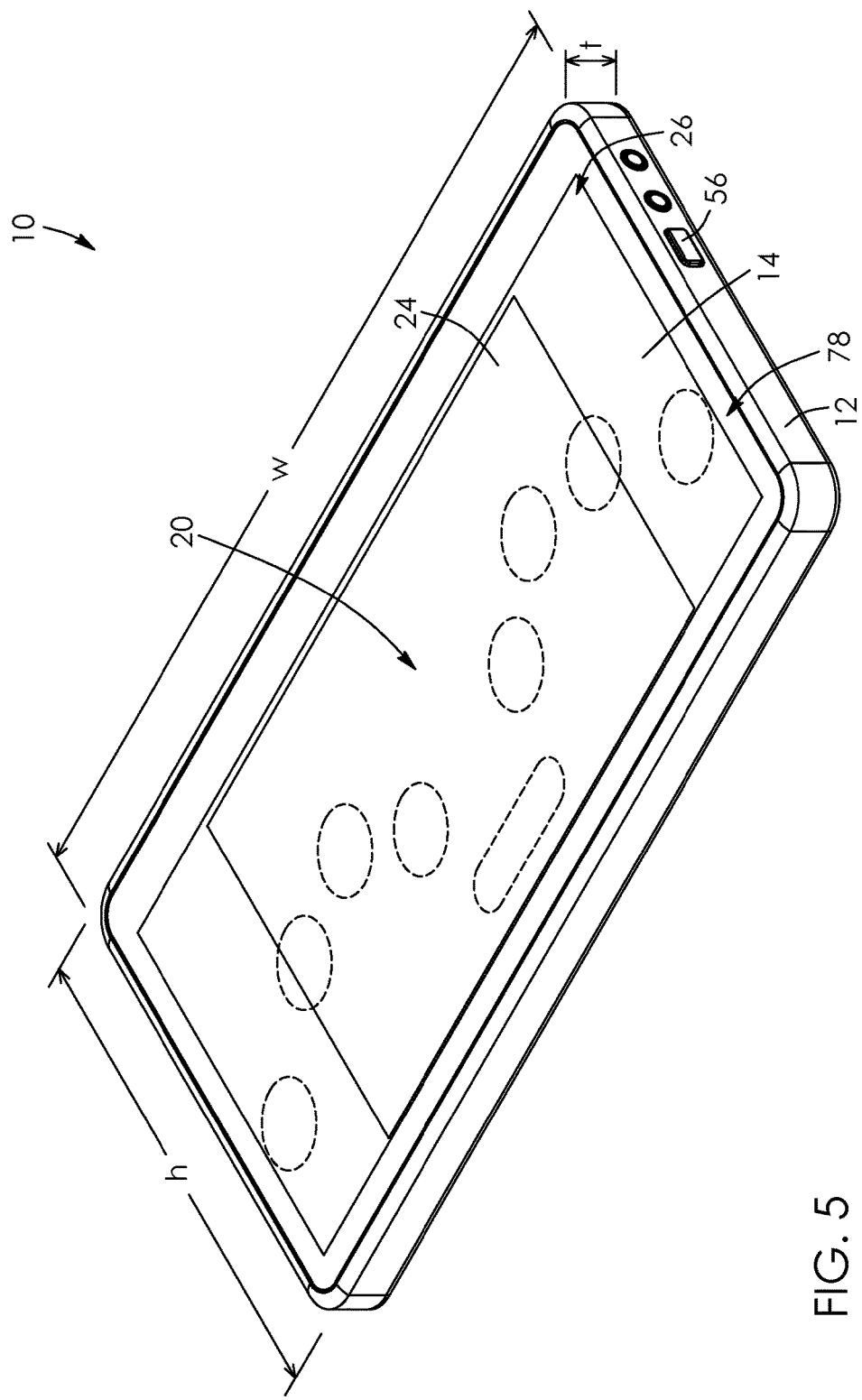
FIG. 5 is a schematic perspective view of a single-unit portable Braille device in accordance with another embodiment.

It is to be mentioned that some embodiments of the portable Braille device described herein may not necessarily include a refreshable Braille display while still being encompassed within the scope of the present invention. For example, referring to FIG. 5, another embodiment of a single-unit portable Braille device 10 is illustrated that includes a housing 12 and a touchscreen 26 extending on the housing 12, but no refreshable Braille display. In this embodiment, the touchscreen 26 includes a visual display 24 and a touch-sensitive surface 14 parallel to and superimposed on the visual display 24 and configured to implement a virtual Braille keyboard 20 configured for entry of input Braille data from a user. The touch-sensitive surface 14 extends across a surface area larger than a surface area of the visual display 24, as discussed above.

Processing Unit

Referring now to FIG. 3, the single-unit portable Braille device 10 further includes a processing unit 18 in the housing 12 for receiving the input Braille data from the touch-sensitive surface 14 and for transmitting the output Braille data to the refreshable Braille display 16, if a refreshable Braille device 16 is provided.

As used herein, the term "processing unit" refers to an entity of the portable Braille device that controls or executes, at least partially, the functions required for operating the portable Braille device. These functions can include, without being limited to, inputting Braille data entered through the virtual Braille keyboard implemented on the touch-sensitive surface and outputting Braille data displayed by the refreshable Braille display.

It will be understood that the processing unit may be embodied as a single unit or a plurality of interconnected processing sub-units, and be implemented in hardware, software, firmware or any combination thereof. For example, the processing unit of the portable Braille device may be embodied by a microprocessor, a microcontroller, a central processing unit (CPU), a processing core, a system on a chip (SoC), a digital signal processor (DSP), a programmable logic device, or by any other processing resource or any combination of such processing resources configured to operate collectively as a processing unit. In particular, the use of the term "processing unit" is not intended to be to limiting.

Although the processing unit according to embodiments of the portable Braille device can be described as a series of various modules, each associated with one or more different functions, it will be understood that, in practice, each module may include a plurality of sub-modules, routines, components, communication ports, software, and the like cooperating together in order to accomplish the corresponding function. It will also be understood that this subdivision into such modules is made from a conceptual standpoint only and that, in practice, a given hardware or software component may be shared by different modules. Likewise, components of different modules may be combined together physically and/or logically without departing from the scope of the present invention. The various physical components of the processing unit and the interconnections therebetween may be provided on an integrated circuit (IC) die, which can itself be mounted onto one or multiple printed circuit boards (PCBs).

The processing unit may be connected to the various components of the portable Braille device, such as the touch-sensitive surface, the refreshable Braille display, the visual display and other internal components via different input/output (I/O) communication ports, such as inter-integrated circuit (I2C) ports, Bluetooth™ ports, serial peripheral interface (SPI) ports and display ports.

It will be understood that the processing unit may be configured to transmit, as the output Braille data, the input Braille data received from the touch-sensitive surface to the refreshable Braille display. In particular, in some embodiments, there may be a one-to-one correspondence between the input Braille data entered via the virtual Braille keyboard implemented on the touch-sensitive surface and the output Braille data displayed by the refreshable Braille display. However, in other embodiments, there need not be such a one-to-one correspondence between the input Braille data and the output Braille data.

Referring to FIG. 3, this lack of one-to-one correspondence between the input Braille data and the output Braille data implies that in some embodiments, the input Braille data entered on the virtual Braille keyboard 20 may not only be displayed on the refreshable Braille display 16 as output Braille data but also, or alternatively, be used to accomplish other functions. For example, the input Braille data may be stored on a memory module 46 of the processing unit 18, displayed as visually readable text on the visual display 24 or on an external monitor wired or wirelessly connected to the portable Braille device 10, and/or converted to a speech output by a Braille-to-speech module 48. In this last case, the portable Braille device 10 may include a speaker device 50 in communication with the processing unit 18 for outputting the speech output.

Likewise, the output Braille data displayed on the refreshable Braille display 16 may originate not only from input Braille data that was previously typed on the virtual Braille keyboard 20 implemented on the touch-sensitive surface 14, but also, or alternatively, from Braille content originating from other sources. Exemplary other sources can include, without being limited to, the Internet, a peripheral device wired or wirelessly connected to the portable Braille device 10 or images acquired by a camera 52 included in the portable Braille device 10. In the last case, the processing unit 18 may include a text-recognition module 54 (e.g., based on optical character recognition) adapted to recognize and render in text form textual information on an image acquired by the camera 52. The processing unit 18 may then convert the recognized textual information to Braille, which can be presented to a user on the refreshable Braille display 16. The processing unit 18 may also include a text-to-speech module 30 to additionally or alternatively output the textual information as an audio output via the speaker device 50.

In some implementations, the processing unit 18 may further include a Braille conversion module 76 to convert Braille coded information (e.g., Grade 1 Braille and Grade 2 Braille) into sighted language coded information. In other implementations, the processing unit 18 may also optionally include a wireless communication module 74, capable of communicating with external devices and systems using one or more of cellular, Wi-Fi and Bluetooth™ protocols or any other appropriate communication protocols.

Additional Components

Referring back to FIGS. 1 to 3, embodiments of the portable Braille device 10 can include various other components. For example, in some embodiments, the portable Braille device 10 can include control buttons 56 on the housing 12, a lighting module 58 associated with the camera 52, and/or one or more sensors. Exemplary sensors can include, without being limited to, an accelerometer 60, a gyroscope 62, an electronic compass 64, a proximity sensor 66 and a global positioning system (GPS) receiver 68.

The portable Braille device 10 can also be connectable to various other devices and peripherals including, without being limited to, a portable or desktop computer, a tablet computer, a smartphone, a cellular phone, a monitor, a printer, an embosser, a scanner, a camera, a keyboard, a disk drive, a flash drive or another other storage device, a microphone, a speaker, headphones, a modem or other communication devices, and various other standalone components. For this purpose, some embodiments of the portable Braille device 10 can include various I/O communication ports. These I/O ports may include a variety of communication standards or custom communication technologies, such as a serial port, a parallel port, a universal serial bus (USB), a high-definition multimedia interface (HDMI) port, a data transfer port, an audio port, a wireless port (e.g., a radio-frequency port, a Wi-Fi port, a Bluetooth™ port and an optical port) or, generally, any appropriate audio, video or data communication port.

Figure 4A:
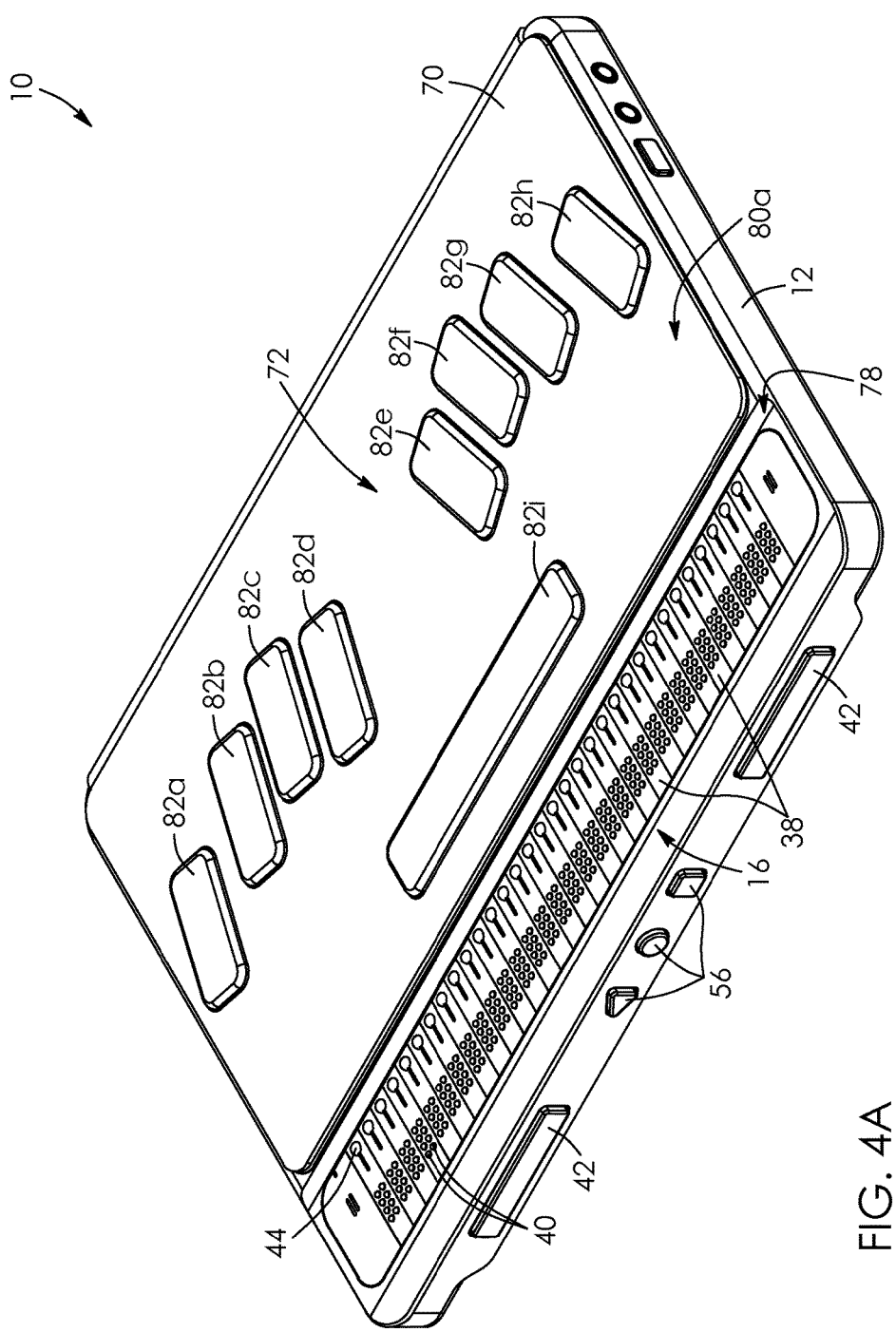
FIGS. 4A and 4B are schematic perspective views of a single-unit portable Braille device in accordance with another embodiment, wherein the portable Braille device includes a typing cover pivotally mounted to the housing and provided with a physical keyboard.
Figure 4B:
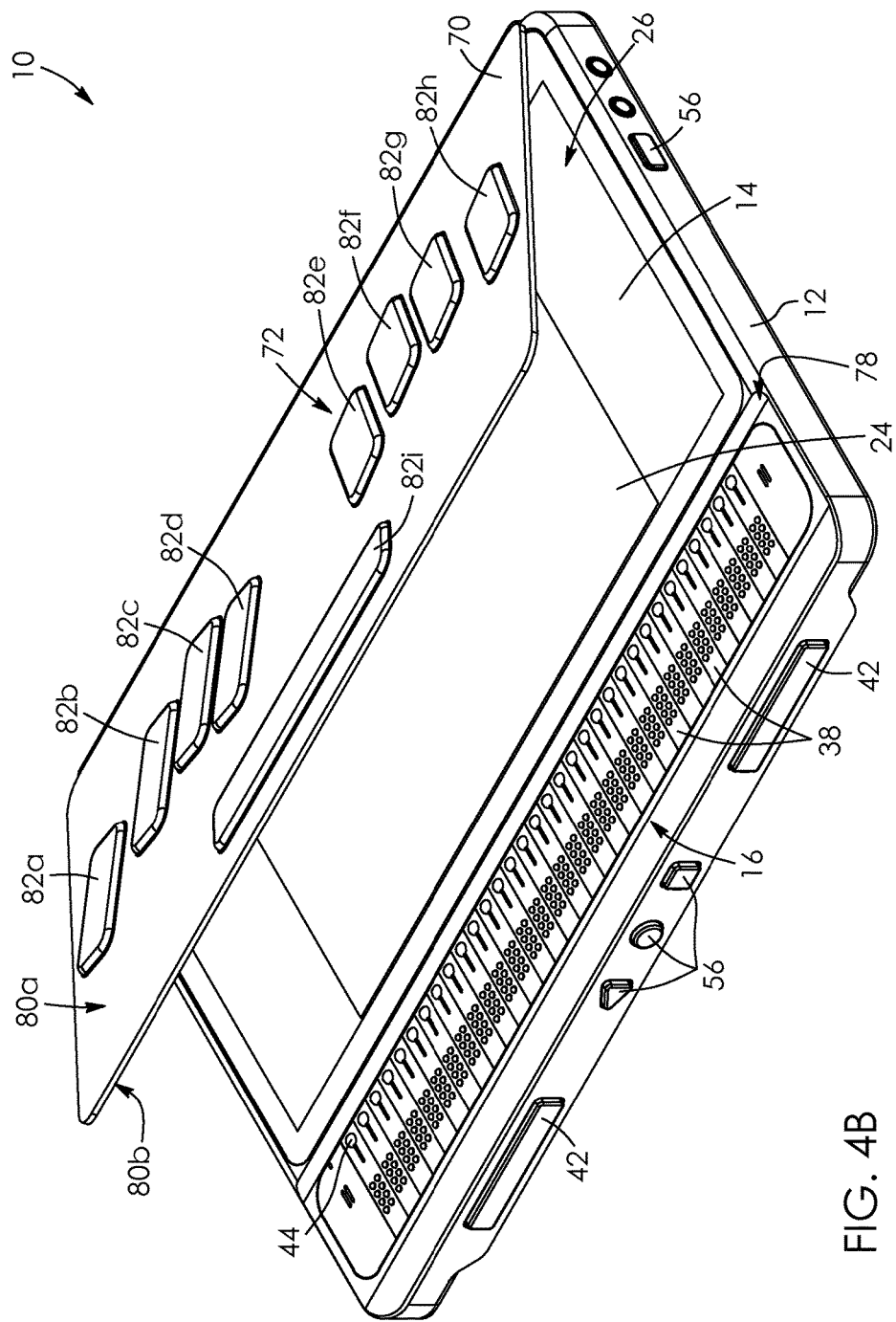

Referring now to FIGS. 4A and 4B, in some embodiments, the portable Braille device 10 may optionally include a typing cover 70 provided with a physical keyboard 72 configured for data entry from a user. In FIG. 4A, the typing cover 70 is removably disposed on the touch-sensitive surface 14 in a typing position where the physical keyboard 72 is operatively connected to the processing unit in a manner such that data entered by the user on the physical keyboard 72 is transmitted to the processing unit. The physical keyboard 72 may be wired and/or wirelessly connected to the processing unit of the portable Braille device 10 to ensure that what is typed on the physical keyboard 72 is received, stored, processed and/or displayed by the portable Braille device 10. Meanwhile, in FIG. 4B, the typing cover 70 is pivoted at an angle from the touch-sensitive surface 14 into a non-typing position.

In the illustrated embodiment, the typing cover 70 is releasably and pivotally mounted to an upper edge of the housing 12 so as to substantially cover the touch-sensitive surface 14 in the typing position. The typing cover 70 is shaped as a thin and flat panel having a typing surface 80a, on which extends the physical keyboard 72, and an opposed contact surface 80b, which faces and contacts the touch-sensitive surface 14 in the typing position. It will be understood that depending on the intended application, the typing cover 70 may or may not be detachably connected to the housing 12. For example, in one possible implementation, the portable Braille device may be configured to be carried inside a thin case to which the typing cover would be hingedly connected. Hence, when fitting the portable Braille device inside the thin case, it would be possible to dispose the typing cover over the touch-sensitive surface and to enable an operational connection between the physical keyboard on the typing cover and the processing unit in the portable Braille device.

The physical keyboard 72 may be implemented as a Perkins-style Braille keyboard with eight dot keys 82a to 82h and a spacebar key 82i. Of course, other embodiments can implement other forms of Braille keyboard layouts to suit a particular application such as, for example, an eight-key Perkins-style Braille keyboard, a six-key Perkins-style Braille keyboard or any other suitable form of Perkins or non-Perkins Braille keyboard layout. In yet other embodiments, the physical keyboard 72 provided with the typing cover 70 may alternatively be a non-Braille keyboard.

It will be understood that embodiments of the portable Braille device that includes a typing cover provided with a physical Braille keyboard may provide additional advantages and benefits over conventional Braille devices in that they can allow a user to switch between a physical and a virtual Braille keyboard to suit the needs of a particular application or task.

Of course, numerous modifications could be made to the embodiments described above without departing from the scope of the present invention.

The invention claimed is:

1. A single-unit portable Braille device comprising:
a housing;
a touch-sensitive surface provided on the housing and configured to implement a virtual Braille keyboard comprising a plurality of virtual keys each associated with a respective one of a plurality of virtual key locations on the touch-sensitive surface;
a typing cover including a physical Braille keyboard comprising a plurality of physical keys, the typing cover being selectively movable between a typing position, wherein the typing cover is disposed over the touch-sensitive surface, and a non-typing position, wherein the typing cover is moved away from the touch-sensitive surface;
a refreshable Braille display provided on the housing and configured for outputting output Braille data for tactile reading by a user, irrespective of whether the typing cover is in the typing position or the non-typing position; and
a processing unit in the housing and configured to transmit the output Braille data to the refreshable Braille display and to receive input Braille data entered by the user, the input Braille data being entered via the virtual Braille keyboard by the user contacting the touch-sensitive surface at one or more of the plurality of virtual key locations when the typing cover is in the non-typing position, and the input Braille data being entered via the physical Braille keyboard and independently from the touch-sensitive surface by the user contacting one or more of the plurality of physical keys when the typing cover is in the typing position.

2. The single-unit portable Braille device according to claim 1, wherein the processing unit is configured to transmit, as the output Braille data, the input Braille data.

3. The single-unit portable Braille device according to claim 1, wherein the touch-sensitive surface and the refreshable Braille display are provided on a same face of the housing.

4. The single-unit portable Braille device according to claim 1, further comprising a visual display located under the touch-sensitive surface and forming a touchscreen therewith.

5. The single-unit portable Braille device according to claim 4, wherein the touch-sensitive surface is shaped as a first rectangle having a first surface area and a first width-to-height aspect ratio, and wherein the visual display is shaped as a second rectangle having a second surface area smaller than the first surface area and a second width-to-height aspect ratio smaller than the first width-to-height aspect ratio.

6. The single-unit portable Braille device according to claim 4, wherein the touch-sensitive surface has a first height and the visual display has a second height substantially equal to the first height.

7. The single-unit portable Braille device according to claim 4, wherein the visual display is configured to display the virtual Braille keyboard to the user.

8. The single-unit portable Braille device according to claim 4, wherein, when the typing cover is in the non-typing position, the visual display is configured to display the input Braille data entered by the user as visually readable text.

9. The single-unit portable Braille device according to claim 1, wherein the virtual Braille keyboard is arranged in accordance with a Perkins-style Braille keyboard layout.

10. The single-unit portable Braille device according to claim 1, wherein the touch-sensitive surface is switchable between a Braille typing mode of the single-unit portable Braille device, where the touch-sensitive surface is implemented as the virtual Braille keyboard, and a non-Braille typing mode of the single-unit portable Braille device, where the touch-sensitive surface is implemented as a virtual non-Braille keyboard.

11. The single-unit portable Braille device according to claim 1, wherein the refreshable Braille display comprises a linear array of one or more rows of adjacent Braille cells, each Braille cell including a plurality of electromechanically controlled pins, each pin being selectively raisable and lowerable in response to electrical commands originating from the processing unit.

12. The single-unit portable Braille device according to claim 1, wherein the processing unit comprises a Braille-to-speech module configured to convert the input Braille data entered by the user.

13. The single-unit portable Braille device according to claim 1, wherein the typing cover is removably and pivotally mounted to the housing.

14. The single-unit portable Braille device according to claim 5, wherein the first width-to-height aspect ratio ranges from about 1 to 2.5 and the second width-to-height aspect ratio ranges from about 1.3 to 2.

15. The single-unit portable Braille device according to claim 5, wherein the touch-sensitive surface has a first width ranging from about 115 to 250 millimeters and a first height ranging from about 40 to 150 millimeters, and wherein the visual display has a second width ranging from about 96 to 220 millimeters and a second height ranging from about 53 to 140 millimeters.

* * * * *